United States Patent
Reversat et al.

(10) Patent No.: US 9,876,338 B2
(45) Date of Patent: Jan. 23, 2018

(54) DEVICE FOR STRIPPING ELECTRIC CABLES USING VIOLET OR BLUE LASER DIODES

(71) Applicant: LASELEC, Toulouse (FR)

(72) Inventors: Fabien Reversat, Colomiers (FR); Stéphane Rougier, Pompertuzat (FR); Pierre Bouvet, Toulouse (FR)

(73) Assignee: LASELEC, Toulouse (FR)

( * ) Notice: Subject to any disclaimer, the term of this patent is extended or adjusted under 35 U.S.C. 154(b) by 427 days.

(21) Appl. No.: 14/411,855

(22) PCT Filed: Jun. 26, 2013

(86) PCT No.: PCT/FR2013/051490
§ 371 (c)(1),
(2) Date: Dec. 29, 2014

(87) PCT Pub. No.: WO2014/001716
PCT Pub. Date: Jan. 3, 2014

(65) Prior Publication Data
US 2015/0162729 A1    Jun. 11, 2015

(30) Foreign Application Priority Data

Jun. 29, 2012    (FR) ...................... 12 56207

(51) Int. Cl.
*H02G 1/12* (2006.01)
*B23K 26/402* (2014.01)
(Continued)

(52) U.S. Cl.
CPC .................. *H02G 1/128* (2013.01)

(58) Field of Classification Search
CPC ........... H02G 1/12; B23K 26/10; B23K 26/36

USPC ............. 219/121.68, 121.76, 121.77, 121.6,
219/121.85, 121.62, 121.65–121.72,
219/121.83

See application file for complete search history.

(56) References Cited

U.S. PATENT DOCUMENTS

| 4,761,535 A | 8/1988 | Lawson |
| 5,837,961 A | 11/1998 | Miller |
| 2011/0247197 A1* | 10/2011 | Finn ................. G06K 19/07749 29/600 |

FOREIGN PATENT DOCUMENTS

| FR | 2690015 A1 | 10/1993 |
| JP | A 2008-234917 A | 10/2008 |
| WO | WO 2011/055785 A1 | 5/2011 |

OTHER PUBLICATIONS

Japanese Office Action for Application No. 2015-519295 dated Nov. 15, 2016.

(Continued)

*Primary Examiner* — Samuel M Heinrich
(74) *Attorney, Agent, or Firm* — Jenkins, Wilson, Taylor & Hunt, P.A.

(57) ABSTRACT

The invention concerns a device for stripping electric cables, comprising at least one stripping beam (10, 11; 110, 111; 209) emitted by a LASER source (1; 101; 201) and focused by an optical assembly (2-4; 102, 103; 203-208) into a focusing point (12, 13), called cutting point, and at least one track (6; 106) for receiving a portion of cable to be stripped, characterised in that each LASER source comprises a LASER diode (1; 101; 201) emitting a stripping beam of which the wavelength is between 400 nm and 460 nm, and preferably of the order of 445 nm.

16 Claims, 5 Drawing Sheets

(51) Int. Cl.
*B23K 26/40* (2014.01)
*B23K 26/36* (2014.01)

(56) References Cited

OTHER PUBLICATIONS

International Search Report for Application No. PCT/FR 2013/051490 dated Aug. 14, 2013.

* cited by examiner

DEVICE FOR STRIPPING ELECTRIC CABLES USING VIOLET OR BLUE LASER DIODES

The present invention concerns a LASER device for the stripping of electric cables.

A single core electric cable usually comprises a conducting core and an insulating sheath surrounding the conductor over the whole of the length thereof, it being possible for said insulating sheath to be constituted by several layers, for example an inside layer of Kapton® and an outside layer of Teflon®. A multicore cable usually comprises several cores each constituted by a conductor and an individual insulating sheath, the group of the cores being surrounded by a metal shielding braid, then by a common insulating sheath (layer of Kapton® and insulating layer of Teflon® for example). To connect a cable to some particular electrical device, it is necessary to strip an end of the cable, that is to say to remove therefrom the insulating sheath over a given length from that end in order to strip the conductor, without damaging it. The stripping of an end of a multicore cable also consists of removing the common insulating sheath over a given length from that end, taking care not to damage the metal shielding braid and the individual insulating sheaths of the various cores. In the whole of the description, "stripping" is used to mean the action of stripping an end of a cable. The stripping of cables is a particularly frequent operation in the field of aeronautics, an aircraft being equipped with several hundreds of kilometers of cables for the control and operation of the various systems of the aircraft, and most of these cables must be stripped at both their opposite ends to enable the connection of the cable to various terminals. In the context of maintenance operations of the aircraft, it is frequent for technicians to have to replace a defective cable; it is in this case more advantageous to strip the ends of the replacement cable in situ, that is to say in the aircraft, which is a particularly confined location. Stripping in situ is sometimes unavoidable, for example when it is impossible to know the length of the cable in advance (such is the case of a multicore cable which follows a zig-zag circuit). There is thus a need, in particular in the aeronautical industry, to have portable cable stripping devices available.

Mechanical stripping devices exist which comprise two blades which are circular or disposed in a V, facing each other and hinged together, making it possible to cut the sheath surrounding the conductor of the cable by shearing. These mechanical devices have various drawbacks.

Each pair of blades is adapted to a given size and type of cable, and it is thus necessary to have available a whole battery of blades to be able to strip the various cables used for example in an aircraft. The use by error of a pair of blades not corresponding to the cable to strip may lead either to an incomplete removal of the insulating sheath and thus an improper connection of the cable to the terminal, or to the cutting of certain wires of the cable conductor, the consequences of which being a reduction in its mechanical strength properties, an increase in its electrical resistance (by reduction of its conducting cross-section) capable of generating hot points, all these defects being capable of leading to the total rupture of the cable. As the blades operate through contact, they tend to wear and must be regularly replaced. Furthermore, the cables used in the aeronautical field have increasingly fine insulating sheaths in order to reduce the mass taken on board an aircraft. Current machining tolerances do not enable blades to be manufactured (at least, not at an acceptable cost) that are capable of reliably stripping recent cables of which the insulating sheath is for example formed of a very thin layer of Kapton® alone. Lastly, the mechanical devices are not adapted for the stripping of cables of which the cross-section is not circular and in particular for the stripping of multicore cables or twisted cables.

Thermal stripping devices also exist which are provided with heated blades applied to burn the insulating sheath. These devices are not satisfactory since they often leave deposits of insulation on the stripped conductor and do not enable precise stripping to be achieved.

LASER stripping devices are also known, the LASER radiation emitted vaporizing the insulating sheath. As this technology does not involve contact, these devices do not suffer from problems of wear. Furthermore, they make it possible not only to strip cables whether cylindrical or not—such as twisted cables—but also to perform all forms of cut in the insulating sheath, for example a window to make a shielding connection. The major drawbacks of the LASER stripping devices are their high cost and lack of compactness.

WO 2008084216 describes a LASER stripping device comprising:
  a base unit including a $CO_2$ LASER emitting infrared LASER radiation;
  a flexible member incorporating a wave guide for the transmission of that LASER radiation; it is to be noted that currently no wave guide exists which is adapted to transmit infrared radiation emitted by a $CO_2$ LASER; the person skilled in the art is not thus capable of producing the device disclosed by WO 2008084216;
  and a portable stripping head receiving the LASER radiation and comprising
    a stripping zone adapted to receive the end of a cable to strip,
    opticals adapted to receive the LASER radiation and to direct it into the stripping zone, towards the cable and around that cable along a cutting path,
    an injector for injecting a gas for the cleaning of the optics made unclean by the vaporized insulation,
    a control to adjust the speed of movement of the radiation along the cutting path or to monitor and possibly modify the power of the LASER radiation emitted.

The device proposed by WO 2008084216 is a response to striving for compactness and an attempt to produce a portable device, but its base unit is still very bulky and does not therefore permit the use of the device in very confined sites. In particular, given the size of the known $CO_2$ LASERs, this base unit would not seem to be able to easily be placed on board an aircraft. Similarly, it is difficult to envision integrating such a stripping device in a cable marking machine. Moreover, the presence of the flexible member linking the stripping head to the base unit hinders the ease of manipulation of the stripping head. Furthermore, no depth of field control of the LASER radiation emitted is provided, such that the electrical conductor is only preserved if it sufficiently reflects the LASER radiation. For the same reasons, it is impossible with such a known device to remove the common insulating sheath of a multicore cable, without the risk of also incising the shielding braid of said cable or the individual insulating sheath of one of its cores.

Gas LASERs, chemical LASERs, solid-state LASERS (crystal-based), semiconductor LASERs grouped here under the designation "LASER diodes", are known.

Only the use of the gas LASER (specifically $CO_2$ LASERs, Excimer LASERs and argon LASERs) has been envisioned until now for the stripping of electric cables. The use of these LASERs which either emit in the infrared or in the ultraviolet enables the integrity of the cable conductors to be ensured, copper reflecting 99% of such radiation. The wavelength of 10.6 µm usually emitted by $CO_2$ LASERs has turned out to be entirely relevant for the stripping of cables not only because copper, generally used as conductor, has a damage threshold which is high at that wavelength but also since most of the insulating materials used to sheath the cables have a low damage threshold at that wavelength. The phenomenon is inversed in the case of the near infrared wavelength of 1.064 µm emitted by a solid-state LASER of Nd:YAG type.

The technology of stripping by $CO_2$ LASER however suffers from numerous drawbacks:

$CO_2$ LASERS are relatively voluminous (100 mm ×100 mm×300 mm approximately for the most compact models, of power 10 W). All the $CO_2$ LASER devices known to date are very bulky. They do not enable in situ stripping.

Their electricity consumption is very high.

Although their beam quality can be high (M2 close to 1), their focusing power is low. It follows that these devices are not adapted to generate a small spot enabling precise stripping.

The infrared wavelength of 10.6 µm requires the use of special optics, such as optics of ZnSe which are much more costly and sensitive than glass. These optics in particular pose problems of cleaning due to their low hardness.

The wavelength of 10.6 µm is not visible to the eye, which complicates the alignment of the beam. It is for example necessary to use a visible beam specifically for the alignment.

The technology of stripping by Excimer LASER emitting in the ultraviolet range (wavelength 0.193 µm. 0.248 µm. 0.308 µm or 0.351 µm for the most commonly used gases) enables fine and precise cuts of cable sheaths to be made. These LASER sources are however extremely voluminous. They are also very costly, not only on purchase but also with regard to maintenance since they require very frequent renewal of the gaseous mixture which, moreover, is very toxic. These LASER sources are pulsed and generate a beam of high peak power which, although it may efficiently incise the cable sheath, is also capable of damaging the metal core.

An example of use for the stripping of cables by a laser emitting in the ultraviolet, that is to say with a wavelength less than 380 nm, is provided by FR 2 690 015. Preferably the LASER is an argon LASER. It is to be noted that argon LASERS exist with a wavelength of 351 nm or 364 nm.

The use of LASER diodes may not, prima facie, be envisioned for various reasons: the known LASER diodes generate a beam of which the wavelength is unfavorable and which is either of too low power or of poor quality. More particularly, the most widespread LASER diodes typically emit in the near infrared range (wavelengths comprised between 0.7 µm and 1.8 µm), a range in which cable sheaths cause strong scatter. These diodes thus prove to be of low effectiveness for stripping cables. To compensate for this low effectiveness, a high power would be necessary. High-power multi-element LASER diodes are now available. However, these latter emit a beam of poor quality, that is to say a beam having a low focusing power, precisely because they are multi-element, that is to say constituted by numerous emitter elements, which do not enable an intense spot of small size (necessary for cable stripping) to be generated simply. This is why LASER diodes are mainly used for welding or lighting applications. They appear to be little compatible, prima facie, with a machining application, which requires precision, such as an electric cable stripping application.

The invention is directed to mitigating these drawbacks, by providing a LASER stripping device which is compact and truly portable—in order to be able to be used at a confined site such as an aircraft or for instance be able to be integrated into a known cable marking machine. The device must also enable single core cylindrical cables of all diameters to be stripped safely and reliably, that is to say without risk of damaging the cable conductor and with the assurance that no insulation deposit remains. In an advantageous version, the invention is also directed to providing a stripping device making it possible to strip any type of electric cable (cylindrical cables, multicore cables and even ribbon cables. Another objective of the invention is to provide a device of which the manufacturing cost is equivalent or less than the known devices.

For this, the invention provides an electric cable stripping device, comprising at least one stripping beam emitted by a LASER source and focused by an optical assembly to a focusing point, referred to as cutting point, and further comprising at least one receiving track for receiving a portion of cable to strip. In a device according to the invention the LASER source comprises a LASER diode, qualified hereinafter as blue or violet LASER, emitting a stripping beam of wavelength comprised between 400 nm (0.40 µm) and 460 nm (0.46 µm).

Advantageously, each LASER source is solely constituted by a blue or ultraviolet laser The inventors have established that the high level of scattering reflection which is observed on most cable sheaths in the visible and near infrared range tends to drop when the wavelength of the stripping beam approaches the ultraviolet range. Below 0.46 µm for some sheaths, and below 0.41 µm for others, the level of absorption increases significantly (in relation with the reduction in the level of scattered reflection), which permits effective stripping using diode power LASERs with GaN technology. These LASER diodes were in particular developed for "Blu-ray Disk" and LASER projection technologies. They are available in the form of mono-element LASER diodes of high power and relatively high beam quality (even though such diodes are generally multimode).

Their short wavelength and their high beam quality make it possible to obtain a cutting point of small size with a reasonable working distance, necessary to obtain quality stripping.

More specifically, LASER diodes may be found on the market which emit a wavelength equal to 375 nm (that is to say in the ultraviolet). The inventors have established that these LASER diodes are of too low power for the application envisioned. Furthermore, their cost remains quite high.

LASER diodes also exist emitting a radiation of wavelength equal to 445 nm or more; these diodes have substantially higher power, a good beam quality, are less fragile, but are prima facie less effective since less favorable to the conductor with regard to their wavelength. However, the inventors have demonstrated that this wavelength, never before tested for operations of cable stripping is compatible with that application after all. Lastly, LASER diodes exist emitting a radiation of wavelength comprised between 400 and 410 nm, for example of the order of 405 nm. The inventors have established that these diodes give a worthwhile compromise for the device according to the invention in terms of price, power and wavelength. Preferably, each LASER source therefore comprises a LASER diode emitting a stripping beam of wavelength comprised between 440 nm and 460 nm or comprised between 400 nm and 410 nm.

The use of violet or blue LASER diodes has numerous advantages relative to the $CO_2$, Excimer or argon LASER technologies previously used.

- The bulkiness of LASER diodes is not commensurate with that of gas LASERs: a LASER diode only measures a few millimeters. This makes it possible in particular to have several LASER diodes in the same stripping device to increase productivity. This also makes it possible to design stripping devices which are much smaller, in which the LASER source or sources may be mounted on movable members. This lastly enables production of portable stripping devices capable of use in situ.
- Their electrical/optical efficiency is very high, which significantly reduces the electricity consumption of the stripping device; it is hence possible to provide an electricity supply from a battery.
- The optics may be of glass or silica; they are thus much easier to supply and are more robust.
- The diversity of the optical and optoelectronic elements available in that wavelength, enables the use of complex schemas such as an autofocus system for the feedback control of the cutting point described later.
- The violet or blue LASER beam is visible (contrary to the ultraviolet beam of the argon laser of FR 2 690 015 and Excimer LASERs and contrary to the infrared beams of $CO_2$ lasers); it is thus very easy to align.
- The LASER beam may be focused to a cutting point of very small size, which makes it possible to generate a cut of the insulating sheath of very high precision, to optimize the optical power necessary and to limit the depth of field of the stripping beam.

As defined previously, the device according to the invention comprises one or more stripping beams. Preferably, when it comprises several stripping beams, each beam is emitted and focused by a LASER source and an optical assembly which are specific to it, such that the device comprises the same number of LASER sources as optical assemblies and as stripping beams. This provision of multiple sources is made possible by the miniature character of laser diodes.

Advantageously and according to the invention, the stripping device further comprises, for at least one cutting point—and preferably for each cutting point—directing structure or structures for moving the cutting point relative to a cable receiving track along a predefined cutting path. Preferably, such directing structure or structures are substantially mechanical.

If it comprises several cutting points, the device may then comprise the same number of mechanical directing assemblies as cutting points, each mechanical assembly enabling individual movement of solely the cutting point with which it is associated, or, as a variant, a single mechanical assembly enabling all the cutting points to be moved conjointly.

Advantageously, the device according to the invention comprises mechanical directing structure adapted to move at least one cutting point around a cable receiving track along a circular path, in a transverse plane. In other words, the beam turns around the cable to strip so as to make a circular incision in its sheath.

Preferably, the device according to the invention comprises directing structure adapted to move at least one cutting point both around and along a rectilinear cable receiving track, so as to enable a cut to be made of window form to make a shielding connection for example.

Advantageously and according to the invention, each cable receiving track passes entirely across the device and is provided with a retractable stop which, in extended position, crosses the cable receiving track and thus closes the passage to the cable in order to enable stripping thereof of one end wedged against the extended stop and which, in retracted position, allows the passage of the cable, it then being possible for the cable to pass across the device in order to enable an incision to be made in any zone of the cable (away from its ends), for example to make a shielding connection, or in order to be able to incorporate a device according to the invention in a production line (comprising for example a marking station) in which the cable passes.

Advantageously, the device according to the invention comprises several rectilinear receiving tracks for cables to strip, these tracks extending in the same plane parallel to each other in a longitudinal direction X, and further comprises a mechanical assembly adapted to move at least one cutting point in a transverse direction Y parallel to the plane of the cable receiving tracks and at a right angle to the longitudinal direction X. This device makes it possible to strip several cables in the context of the same stripping operation.

Advantageously, the device according to the invention comprises at least two stripping beams, the cutting points of said beams being situated on respective opposite sides of a cable receiving track, in the same transverse stripping plane (which is a plane at a right angle to the longitudinal direction of the cable receiving track).

In a first possible embodiment, the device according to the invention comprises three or four stripping beams distributed around a cable receiving track, each of the stripping beams being formed by a primary beam emitted by a blue or violet laser diode in the stripping plane, that is to say in a plane at a right angle to the cable receiving track, and reflected by a motor-driven pivoting mirror, the three or four motor-driven pivoting mirrors being controlled out of synchronization such that the stripping beams do not cross each other. In the case of a device comprising four stripping beams (and thus four diodes and four mirrors) the motor-driven pivoting mirrors are preferably controlled in pairs (two incisions are thus made simultaneously in the cable sheath). It is to be noted that each motor-driven pivoting mirror forms part both of the "optical assembly" and of the "directing structure" as defined above, which are associated with a stripping beam.

In a second possible embodiment, the device according to the invention comprises three or four stripping beams distributed around a cable receiving track, each of the stripping beams being formed by a primary beam emitted by a blue or violet laser diode in a direction parallel to the cable receiving track, and reflected by a motor-driven pivoting mirror. Compared with the first embodiment with primary beams at right angles to the cable receiving track, this second embodiment with primary beams parallel to the cable receiving track is more compact.

This second embodiment may be provided in two variants. In the first variant, the motor of each motor-driven pivoting mirror is arranged immediately in front of the corresponding mirror, the expression "in front of" making reference to a direction defined as follows. The device comprises an external casing having a front face, and an opposite back face; the front face is that by which a cable to strip may be inserted into the device, the cable receiving track extending inside the casing from the front face and preferably as far as the back face. In other words, in this first variant, each motor is arranged between the associated mirror and the front face of the device.

In the second variant, each motor-driven pivoting mirror is associated with a motor arranged behind the corresponding laser diode, the device here too having a front face by which a cable to strip may be inserted into a cable entry aperture. In other words, in this second variant, for each stripping beam there are to be found successively along the cable receiving track, from the front face of the device: the motor-driven pivoting mirror, the laser diode and the motor that is associated with the mirror. By shifting the position of the motor associated with the mirror to behind the device, the stripping plane is displaced towards the front face of the device, which is particularly advantageous for a portable device which must be brought to the cable to strip (and not the converse) in a confined cabling environment.

Advantageously and according to the invention the device comprises, for each cable receiving track, a holding assembly for holding a cable to strip in the cable receiving track, and the holding assembly comprises a gland provided with a sleeve of light-tight elastic material. The compression of the sleeve by the gland around a cable to strip makes it possible to render the device light-tight and thereby avoid any risk of burning the operator.

Preferably, each holding assembly comprises a slide able to slide in a direction at a right angle to the cable receiving track and comprising at least two through passages of different inside diameters, each through passage being provided with a gland with a sleeve of a light-tight elastic material.

Advantageously, the device comprises calibration adapted to measure a diameter of a cable to strip accommodated in a cable receiving track and to adjust the position of at least one cutting point relative to said track according to the diameter measured. Any appropriate structure or structures may be used to btain a measurement of the diameter. By way of example, a mechanical member comprising a jaw for holding the cable which comes to pinch the cable and is mounted on sliding calipers may be used. As a variant, the calibration comprises a gland as described above. The distance of movement of the gland, which depends on the diameter of the cable, may then be used to determine that diameter. As a variant, an optical detection member may be used.

In a preferred version, the device comprises, for at least one stripping beam, a monitoring system for verifying the progression of the stripping.

Preferably, this monitoring system comprises structure, such as one or more photodiodes for the capture and the analysis of an optical verification signal emitted by a cable aimed at by said stripping beam, and a control to adapt scanning parameters (for example angle and/or speed of pivoting of a motor-driven pivoting mirror as described above) according to the results of analysis of the optical verification signal. This optical verification signal corresponds either to the LASER beam scattered back by the cable, or to light emission (fluorescence or incandescence) generated by an interaction of laser/insulation to strip.

This optical verification signal is preferably acquired using at least one photodiode (semiconductor component having the capacity to detect radiation in the optical range and to transform it into electrical signal), whether or not spectrally filtered (for example an infrared filtered photodiode only captures wavelengths close to infrared and is thus not sensitive to the intense reflection of the blue LASER beam) making it possible to measure either a variation in the reflectivity of the blue laser beam, or the incandescence generated by the burning of the layer of Kapton® (polyimide) often present under the upper sheath of PTFE or other material. A variation in the reflectivity during stripping of a cable of which the insulating sheath is constituted by a single type of polymer makes it possible to know whether the metal core or the metal shielding has been reached. The detection of intense sputtering when stripping a cable of which the insulating sheath comprises an under layer of Kapton® in the same way makes it possible to know that the stripping has been properly carried out locally.

It is to be noted that photodiodes are standard components of low cost. Here too, their very small dimensions enable a device to be obtained which is of low bulk and which is light. In the case of a device comprising several LASER diodes, or more generally several stripping beams, the same number of diodes for verification as stripping beams may be provided. The device obtained remains sufficiently compact and light to be portable, for the use in an aircraft for example.

For the stripping of multicore cables having a layer of polyimide between the conducting core and the metal shielding, a filtered photodiode not capturing the wavelengths emitted by the laser diode may for example be used to verify the state of advancement of the stripping process by detecting the presence of bright flashes which are characteristic of a laser/polyimide interaction. As soon as that polyimide layer is reached (which may occur if the shielding is not perfectly continuous and opaque) and bright flashes are thus detected, the stripping beam is moved so as not to risk cutting the underlying conducting wires.

For the other cables, an unfiltered photodiode makes it possible to detect a difference in reflection of the stripping beam and thus enable the stripping operation to be continued until the conducting core or the metal shielding of the cable has been reached.

Advantageously, the device comprises an autofocus system for the feedback control of a cutting point, adapted to determine the position of said cutting point relative to a surface of a cable to strip accommodated in the corresponding receiving track (receiving track aimed at by said cutting point). In a possible embodiment, this autofocus system comprises two verification beams which are coplanar with the stripping beam (corresponding to the controlled cutting point) and surround the latter, as well as structure (such as a linear sensor) for capture and analysis of a verification image formed by radiation reflected by a cable accommodated in the receiving track (aimed at by said stripping beam); moreover, said receiving track extends in a longitudinal direction qualified as inclined, which, in a plane containing the stripping beam and the receiving track, forms a non-zero angle with a normal direction of stripping which would be at a right angle to the axial direction of the stripping beam. The verification beams may be generated by low power LASER diodes specific to them. As a variant, they are generated by the LASER diode generating the stripping beam, with which is associated a three-beam diffractive generator enabling the radiation emitted by the LASER diode to be separated into three beams (a central stripping beam and two lateral verification beams, of lower power).

In one version of the invention, the monitoring system or the autofocus system further comprise a polarization splitter cube enabling the stripping beam and any verification beams to be oriented towards the cable receiving track and to transmit to the image sensor or the photodiode only the reflected radiation.

Preferably, the device according to the invention operates on an autonomous battery.

Furthermore, it is advantageously connected to a device for suction and filtration of the smoke generated by the vaporization of the cable sheaths.

Given its small bulk, the LASER stripping device according to the invention may be integrated into a cutting machine which unwinds and cuts a spool of cables to a desired length. It may thus be integrated into a cable making machine. In both these cases, a device according to the invention should preferably be used which is entirely passed across by the cable receiving track or tracks.

The present invention extends to a LASER stripping device characterized in combination, by all or some of the features referred to above and below.

Other details and advantages of the present invention will appear from the reading of the following description, which refers to the diagrammatic appended drawings and which relates to preferred embodiments, provided by way of non-limiting examples. In the drawings.

Figure 1:
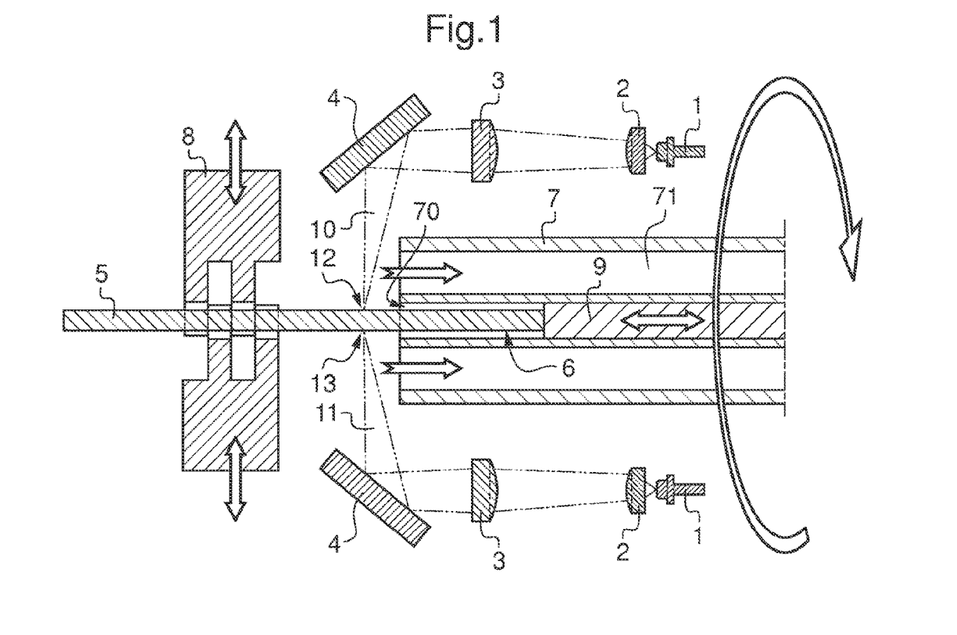
FIG. 1 is a diagrammatic view in longitudinal cross-section of a first embodiment of a stripping device according to the invention.
Figure 2:
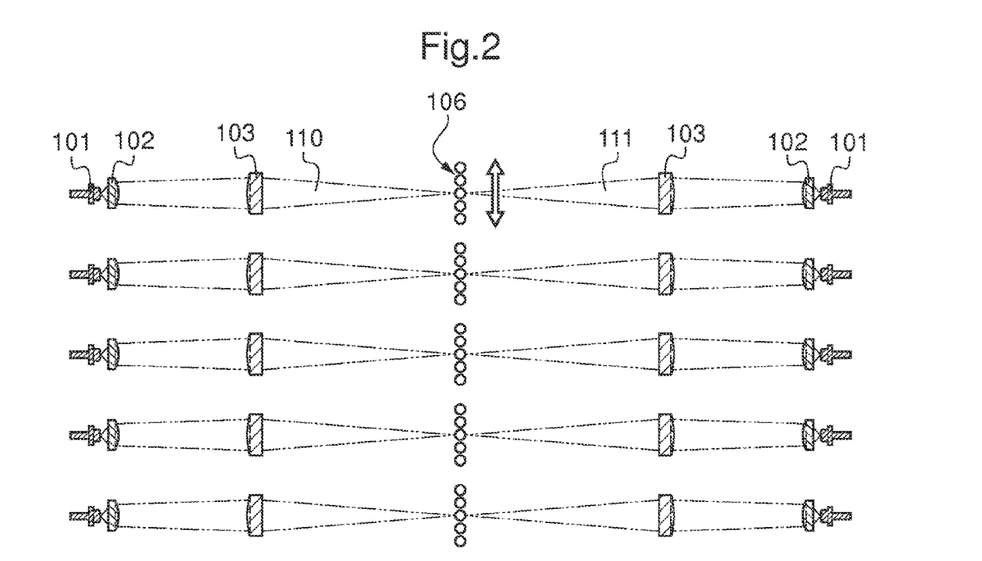
FIG. 2 is a diagrammatic view in transverse cross-section of a second embodiment of a stripping device according to the invention.

In general terms, the various embodiments of the invention may be classified into three families:

a first family of devices comprising one or more stripping heads that are movable relative to the cable to strip; that is the case of the devices illustrated in FIGS. 1 and 2, a second family of devices comprising one or more stripping heads of which only one part (for example a mirror) is movable relative to the cable to strip, the LASER diode or diodes remaining fixed in the device; such is the case for the devices illustrated in FIGS. 5 to 8, a third family of mixed devices comprising one or more stripping heads of which part is movable relative to the cable to strip (as for the devices of the second family), all the stripping heads furthermore being able to be integrally moved, as a block, in the device, for example in a transverse direction as illustrated in FIG. 2 or in a longitudinal direction along the cable receiving track or tracks in order to make a longitudinal incision for example to facilitate the extraction of the insulation and to make a window in the context of a shielding connection.

FIG. 1 represents a first example of a cable stripping device of the first family. This first example comprises two stripping heads for the emission of two coplanar stripping beams 10 and 11. Each head comprises a blue or violet laser diode 1, that is to say a diode emitting with a wavelength comprised between 0.40 µm and 0.46 µm, and an optical assembly comprising collimation optics 2, focusing optics 3 and a deflecting mirror 4. The stripping beam 10 is thus focused at a cutting point 12, whereas the stripping beam 11 is focused to a cutting point 13. The stripping device illustrated further comprises a track 6 for receiving a cable 5 to strip, which is delimited by a tubular guide 7 which for that purpose has a central hollow 70, and by a holding jaw 8. The cable 5 is inserted from the left of the Figure as far as an adjustable stop 9 housed in the central hollow 70 of the guide 7. The position of the stop 9 in the longitudinal direction relative to the guide 7 may be adjusted by the user by any appropriate approach or structure (not shown). More particularly, the stop 6 slides in the hollow 70 of the tubular guide 7.

It will be easily understood that the jaw 8 which contributes to defining the receiving track 6 and to holding the cable 5 in position adapts to the diameter of the cable to strip. The position of each cutting point 12, 13 may be indexed mechanically on the opening (distance between the jaw members) of the jaw 8, so as to maintain a working distance (distance between the cutting point and the surface of the cable) that is substantially constant whatever the diameter of the cable to strip. Such an indexing system (not shown) constitutes mechanical calibration according to the disclosure herein.

The two stripping heads (diode 1+optics 2 and 3+deflecting mirror 4, which deflecting mirror 4 stays fixed relative to the diode and the primary beam which it generates) of the device are made to rotate around the cable to strip. This rotary movement is carried out using directing structure comprising a motor of which the speed is optimized according to a stripping program, an item of information on the diameter of the cable which may be determined using a sensor measuring for example the movement of the jaw members of the jaw (8).

Such an embodiment with a rotary stripping head or heads may comprise one or more (two as illustrated, or more) stripping heads.

The devices of the first family of rotary stripping heads such as that of FIG. 1 have the advantage of having cutting points which follow circular paths, that is to say paths which closely conform to the geometry of the cables, whereas the cutting points of the device of the first family illustrated in FIG. 2 or devices of the second family illustrated in FIGS. 5 and 6 (described later) follow rectilinear paths that are less favorable. That being the case, it is possible to provide each stripping head of these devices with an autofocus system as described later to compensate for that defect when it proves to be critical (according to the nature of the cables to strip).

Certain stripping parameters such as the luminous power of the LASER diodes, the speed of rotation of the optical heads or the number of rotations may be adjusted by a monitoring system for controlling the progression of the stripping. In a simple version, this monitoring system, not shown in the appended drawings, comprises a photodetector (photodiode) measuring the intensity of an optical verification signal emitted by the cable surface. In the devices of the second family, a photodetector is advantageously provided for each stripping head.

To be precise, the intensity of the flux scattered back or generated by fluorescence by the surface of the cable (here called "optical verification signal") varies according to the material struck by the LASER beam, which makes it possible to know for example that a first layer of the insulating sheath of the cable has been fully machined and that a second layer is in course of being so or for instance that the metal core of the cable is bare (the intensity of the flux scattered back varying abruptly when the laser beam reaches the metal core of the cable after having passed through the polymer materials of the insulating sheath). The optical verification signal depends on the angular and longitudinal travel of the stripping beam.

It may be taken into account in real time by a control adapted to adjust the LASER power or the speed of movement so as not to persist more than necessary and to optimize the operating speed.

It may also be used in a scheme with several passages to compute LASER parameters for subsequent passages. For example, a first passage at high speed and low LASER power enables zones qualified as easy to be stripped. The optical verification signal makes it possible to locate these already stripped zones and to turn off or reduce the LASER power at the location of those zones at the following passage. And so forth, for the following passages, until the 360° of circumference or the desired linear length has been fully incised In this way it is possible to perform machining insulating layer by insulating layer, without persisting on the easy zones of small thickness or that are closer to the cutting point of each stripping beam.

This monitoring function is particularly worthwhile for the stripping of shielded twisted multicore cables (an operation also referred to as baring), of which cables the braided helical metallic shielding is not always fully opaque (in places the mesh may be slightly distended).

To be precise, the cross-section of this type of cable is not circular and thus has a surface that is at a greater or lesser distance from the cutting point of each stripping beam. It is furthermore frequent for the upper insulation to be wrapped, and have zones composed of a single layer of strip and zones constituted by two or even more layers of strip. In this context, certain zones will strip more quickly than others. If this type of cable is stripped at constant power and speed, the easy zones (zones having only one layer of strip or zones situated at the location of the cutting point) will be persisted upon in order for the difficult zones (zones having several layers of strip or zones situated upstream or downstream of the cutting point) to be fully incised. By persisting on certain zones, which may correspond to points at which the mesh of the shielding braid is imperfect, it cannot be ruled out that the insulating sheath of the underlying wires will be damaged, which cannot be accepted. By using the monitoring function either in real time, or in the context of a scheme with several passages as described earlier, or according to another scheme enabling the LASER energy to be dosed locally, it is possible to ensure stripping or baring that is fully controlled and safe in relation to the entirety of the wires underlying the shielding.

In addition to its function of guiding the cable 5 and the adjustable stop 9, the tubular guide 7 is also used to suck away the smoke given off by the vaporization of the polymer materials constituting the sheath. For this purpose, it has an annular hollow 71 (surrounding the central hollow 70) or a plurality of hollows the cross-section of which is circular or another shape, which are situated around the stop 9, in which the smoke may pass, and onto which a suction and filtration device may be connected.

FIG. 2 represents a second example of a device of the first family, which enables collective stripping of a high number of cables loaded onto a translation plate.

Such a device comprises at least one cable receiving track 106 and a pair of stripping heads generating two stripping beams 110, 111 in a transverse plane (a plane at a right angle to said receiving plane 106) said beams extending on respective opposite sides of said track in that transverse plane (plane of the Figure). Each stripping head comprises a blue or violet LASER diode, 101 and optics 102, 103 for putting the stripping beam 110 or 111 into form. The device further comprises mechanical translation structure for translation of the receiving track in a transverse direction (that is to say at a right angle to the receiving track 106) and at a right angel to the direction of the stripping beams. As a variant, it may be provided that the translation structure does not move the track but the corresponding stripping heads in the transverse direction. In both cases, the translation structure constitutes mechanical directing structure according to the disclosure herein.

Several cable receiving tracks and stripping heads (here five tracks and five pairs are represented) may be disposed in the same device so as to strip a high number of cables at a time. This device furthermore makes it possible to strip not only cylindrical single core cables but also ribbon cables (as illustrated) by virtue of the transverse translation of the receiving tracks.

The device for stripping by blue or violet LASER diodes according to the invention may possibly include an autofocus function for the feedback control of a cutting point on the surface of the cable. This function is highly advantageous for the stripping of twisted multicore cables, of non-circular cross-section, and of which the wires situated under the sheath may be damaged by the LASER beam. In the case of the stripping of cylindrical cables, it also ensures perfect stripping (without any lesion of the conductor or any trace of remaining insulation), or to adapt the device to the diameter of the cable with extreme precision.

The autofocus function makes it possible to work with a LASER beam at a very short depth of field and to follow the topology of the cable in real time using a computer, while the optical he moves axially along the cable or in a circular movement relative to the cable.

Figure 3:
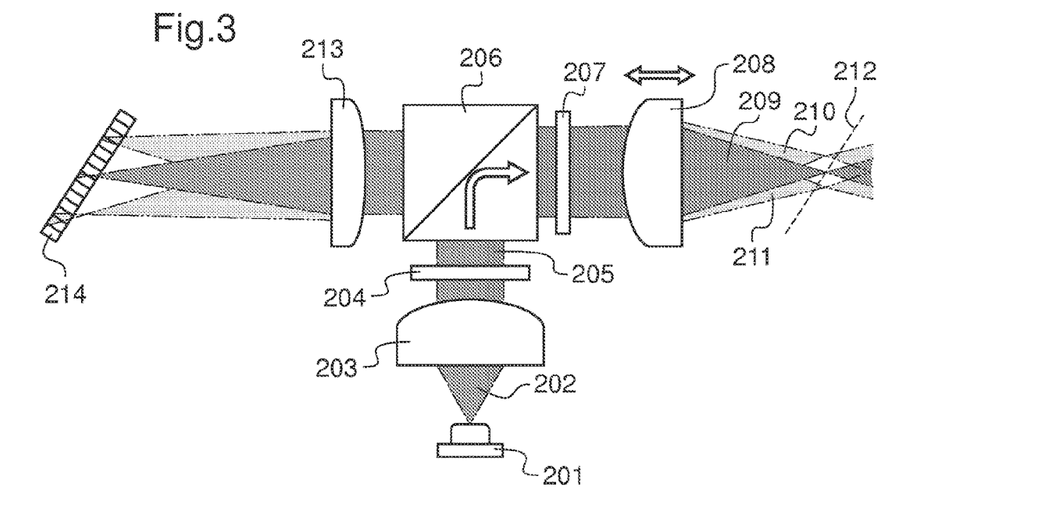
FIG. 3 is a diagrammatic view in longitudinal cross-section of a third embodiment of a stripping device according to the invention.

The embodiment of FIG. 3 illustrates an operating principle of such an autofocus function. The blue or violet LASER diode 201 emits a beam, referred to as primary beam 202 which is collimated by optics 203. The primary beam 202 passes through a three-beam diffractive generator 204, which is a sort of hologram enabling two sub-beams of low power to be generated on opposite sides of the undeviated main beam. A triple beam 205 output from the generator 204 is thus observed. The optical polarization of the triple beam LASER is rectilinear and oriented such that the triple beam is reflected by a polarization splitter cube 206.

The triple beam passes through a quarter-wave plate 207 which makes it possible to convert the rectilinear polarization state of the incident wave into a circular polarization state.

The triple beam then passes through active focusing optics 208, at the exit of which are three practically parallel beams: a central stripping beam 209 of high power, and two lateral beams 210, 211, referred to as verification beams, of low power. This active optics 208 enables the position of the focusing point of the cutting beam 209 to be adjusted on the surface of the cable whatever the position of the latter. The main central beam (stripping beam 209) serves for the stripping of the cable, the two adjacent sub-beams (verification beams 210, 211) only serve for the autofocus function.

The active focusing optics 208 may be a simple lens or an arrangement of lenses, mounted on a longitudinal translation plate (translation in the axial direction of the beams 209-211) or else an electrically controlled variable focus lens.

The three beams 209-211 intercept the surface of the cable 212, which cable is inclined relative to a normal direction of stripping which would be at a right angle to the axial direction of the three beams.

The three beams are back scattered by the surface of the cable 212. Part of the back-scattered flux passes through the active lens 208 in the reverse direction, then the quarter-wave plate 207. The latter transforms the circular polarization state of the back-scattered flux into a rectilinear polarization state which is crossed relative to the rectilinear polarization state of the primary beam 202 emitted by the diode.

The back-scattered beam is then transmitted by the polarizing splitter cube 206 and passes through an imaging objective 213 (focusing lens for example). A linear image sensor 214 is disposed in the focal plane of the imaging objective 213, it receives the image of the surface of the cable 212 illuminated by the three beams (cutting beam 209 and verification beams 210, 211).

Figure 4A:
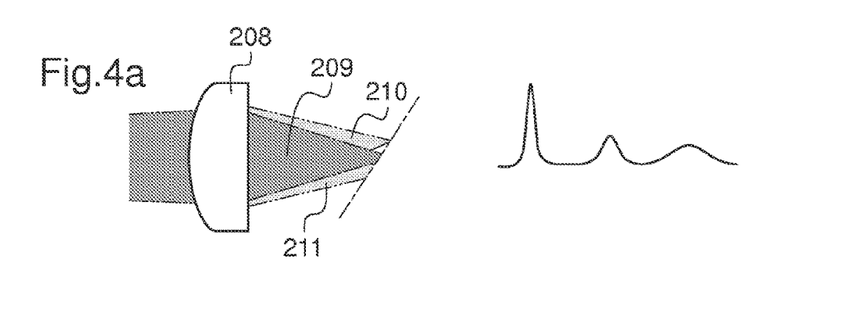
FIGS. 4a to 4c represent, in longitudinal cross-section, a downstream part of the view of FIG. 3, in three different situations (cutting point focused respectively beyond, on or before the surface of the cable to strip) and the signal obtained at the output of a verification sensor in each of these three situations.
Figure 4B:
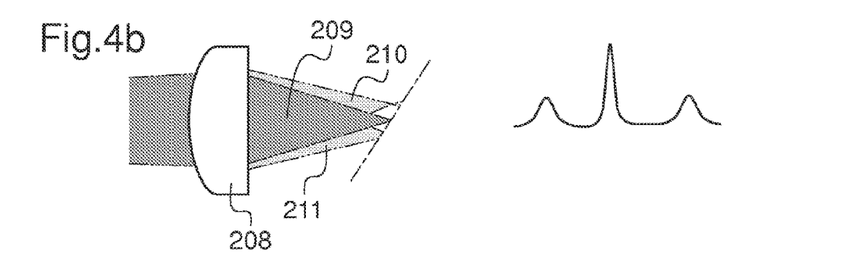
Figure 4C:
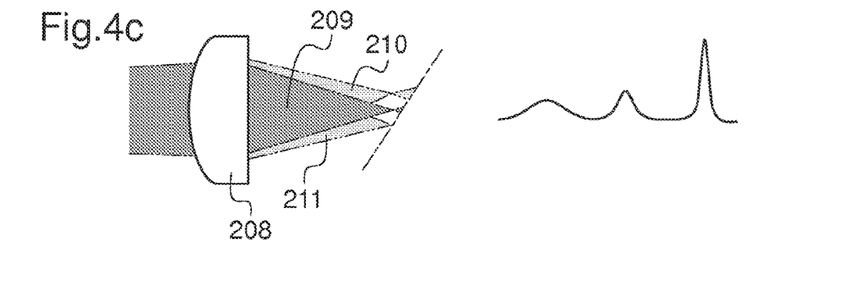

The analysis of the image received by the image sensor 214 makes it possible to obtain feedback control of the position of the cutting point of the stripping beam on the surface of the cable 212. An illustration of the principle is provided in FIGS. 4*a* to 4*c* If the stripping beam 209 is too long, that is to say if the cutting point is situated beyond the surface of the cable (which corresponds to FIG. 4*a*), the verification beam 210 is better focused than the verification beam 211 and its image point is thus smaller and more intense (image signal of greater amplitude). If the stripping beam 209 is too short, that is to say if the cutting point is situated in front of the surface of the cable (FIG. 4*c*), the verification beam 211 is better focused than the verification beam 210 and its image point is thus smaller and more intense.

It should be noted that as the two verification beams 210, 211 are focused on the cutting zone, formed by the central beam for stripping 209, their image is not altered by the deterioration of a cable in course of machining.

This system makes it possible to know both the direction and the proportion in which the correction is to be made, an electronic computer enabling the control of the active lens 208 on the basis of the analysis of the signal generated by the image sensor 214 in real time, so as to always maintain an optimal cutting point.

The image of the cutting point may also be used for feedback control of the stripping parameters, such as the power of the LASER diode, the speed of movement of the stripping head, etc.

An autofocus system such as that illustrated in FIGS. 3 and 4*a* to 4*c* may also be associated with each of the stripping heads of a rotary head device such as that of FIG. 1.

When it comprises several stripping beams, the device according to the invention may integrate a single LASER source and a single optical assembly enabling all the stripping beams to be generated. Preferably, a device according to the invention comprises the same number of LASER diodes as optical assemblies and as stripping beams. This provision of multiple sources is rendered possible by their miniaturization.

Figure 5:
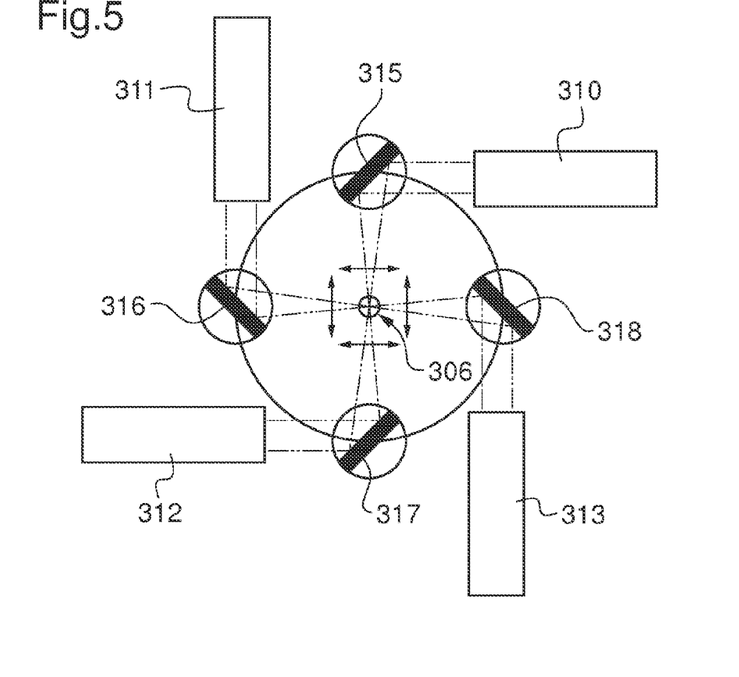
FIG. 5 is a diagrammatic view in transverse cross-section of an embodiment of a device according to the invention provided with four LASER diodes emitting transverse primary beams.

FIG. 5 thus illustrates a stripping device according to the invention comprising four stripping heads distributed around a cable receiving track 306, each stripping head comprising a fixed LASER diode 310 to 313, a motor-driven pivoting mirror 315 to 318 and a motor (not shown) for driving the mirror. Of course, the device could comprise only two or three stripping heads, or on the contrary possibly more than four stripping heads.

Whereas only one motor is necessary in the example of the first family illustrated in FIG. 1, the devices of the second family comprise the same number of motors as there are stripping beams. However, the second family is better adapted to producing portable devices since the movable parts are fewer in number and in weight therein, which enables the use of motors that are less powerful, less bulky and lighter. A second advantage of the second family is to permit greater tolerance for the holding of the cable since a little margin may be taken on the scanning angles of the mirrors, such that a slight transverse offset of the cable does not pose any problem by contrast to the embodiments of the first part. A very simple holding system such as that represented in FIGS. 9 to 11 may thus be used.

In the first example of the second family illustrated in FIG. 5, each LASER diode is arranged so as to emit a transverse primary beam of which the axis is contained in the transverse stripping plane (in other words, the axis of each primary beam is at a right angle to the cable receiving track 306). Each mirror 315 to 318 is mounted to oscillate (or pivot) such that the cutting points of the stripping beam generated by reflection of the primary beams on those mirrors are moved over a few millimeters in the directions indicated by the double arrows in the Figure. Thus, each LASER diode (and its associated mirror) makes an incision in the sheath of the cable over a quarter circle. Preferably, the stripping heads are controlled such that two consecutive LASER diodes, for example the diodes 310 and 311,312 and 313, are active at the same time and that, the stripping beams they generate do not meet. By making two incisions simultaneously, the time to perform a stripping operation is reduced.

Figure 6:
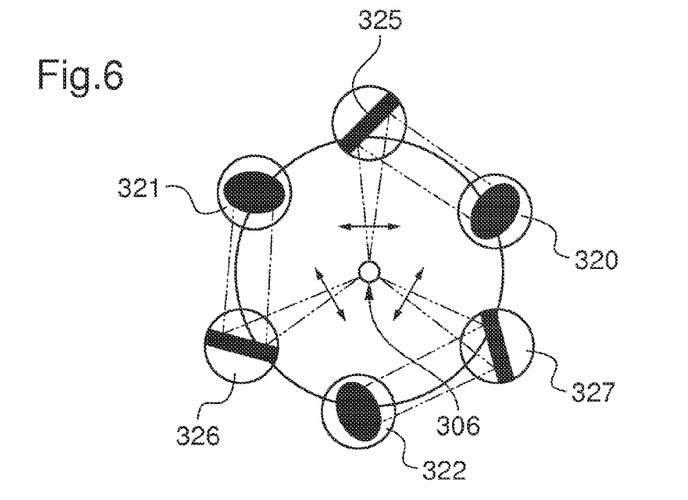
FIG. 6 is a diagrammatic view in transverse cross-section of an embodiment of a device according to the invention provided with three LASER diodes emitting longitudinal primary beams (parallel to the cable receiving track)
Figure 8:
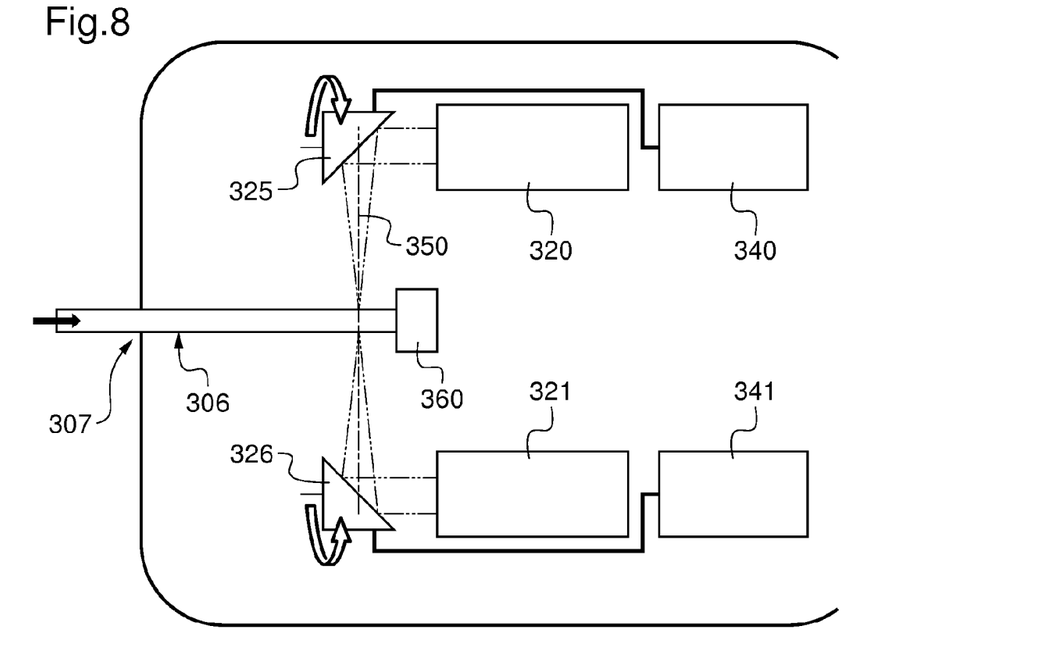

FIG. 6 illustrates a second example of a device according to the invention of the second family, that is to say comprising a plurality of stripping heads comprising a pivoting mirror and a fixed LASER diode, but which emit longitudinal primary beams, that is to say parallel to the receiving track 306. The illustrated example comprises three LASER diodes 320 to 322. Of course, a device comprising two, four or more, LASER diodes with longitudinal primary beams is also in accordance with the invention. In this device, each LASER diode 320 to 322 is combined with a motor-driven pivoting mirror 325 to 327. The motor 341, 342, associated with each pivoting mirror is preferably offset rearwardly of the device as illustrated in FIG. 8, the front face of the device being defined as being the face provided with an aperture 307 for entry of a cable to strip.

Figure 7:
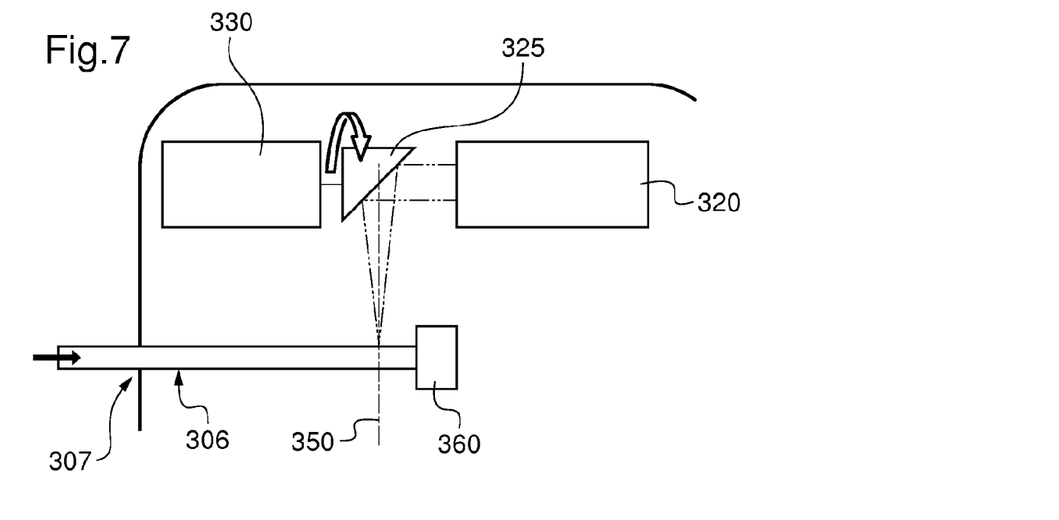
FIGS. 7 and 8 are diagrammatic views in longitudinal cross-section of two embodiments of a device according to the invention (FIG. 7 only showing part of the device) provided with several LASER diodes emitting primary beams parallel to the cable receiving track.

As a variant, each motor is arranged in immediate proximity, at the front, to the mirror which it makes pivot as illustrated in FIG. 7. This variant is less advantageous than that of FIG. 8 in particular in the case of a portable device adapted to be used in confined cabling environments, since the stripping plane is necessarily away from the front face of the de to permit the housing of the motors.

In both the above-described variants, a retractable stop 360 is associated with the cable receiving track 306. Any appropriate structure (not shown) may be used to move that step between an extended position and a retracted position. In extended position, that is to say as illustrated in FIGS. 7 and 8, the stop 360 serves as a stop at the end of the cable inserted into the device. In retracted position (not shown), the stop 360 is at a distance from the cable receiving track 306 and a greater length of cable may be inserted into the device. It is advantageous to provide a stop which is both retractable such as the stop 360 and adjustable (with an adjustable position) such as the stop 9 illustrated in FIG. 1. The person skilled in the art can easily design such a stop which does not appear in the accompanying drawings.

It is to be noted that, in the manner of the devices of the first family, each stripping head of the devices of the second family may be equipped with a monitoring system (with one or more photodiodes) as described above and/or with an autofocus system.

The examples of the second family may be provided in a version (third family) in which the block constituted by the three (or more) stripping heads with scanning of the stripping beams, is made to translate along the cable to strip, so as to be able to make at the same time an annular incision and one or more (if several diodes are turned on) longitudinal incisions (slots), to facilitate the extraction of the insulation and to produce a window for shielding connection. Similarly, the block constituted by the three or four stripping heads with scanning of the stripping beams may be made to translate in a transverse direction so as to successively strip several cables as in the illustration of FIG. 2.

Figure 11:
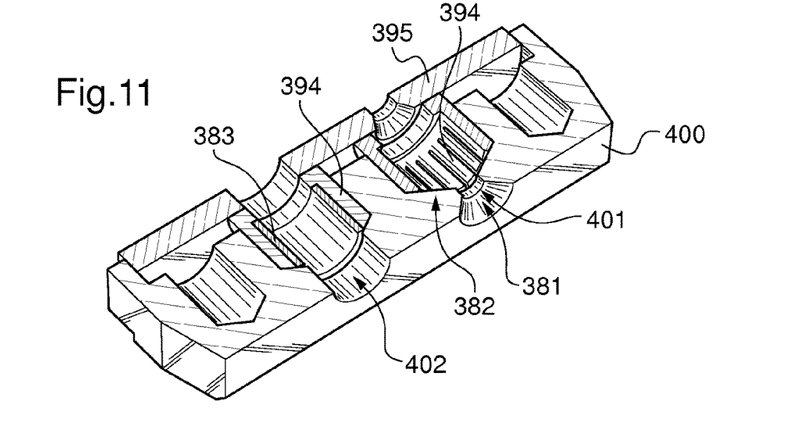
FIG. 11 is an exploded diagrammatic view in perspective of a holding assembly with a slide and glands of a device according to the invention.

FIG. 11 illustrates a holder for holding a cable to strip of a device according to the invention. The holder comprises a slide 400 having two through passages 401, 402 of different minimum inside diameters in order to enable cables of diameters comprised within a large range to be accommodated. The slide may be moved by any appropriate structure (for example such as a rack formed in a lower face of the slide and a corresponding pinion) in a transverse direction so as to enable one of the through passages 401, 402 to be aligned with a cable receiving track 306.

Figure 10:
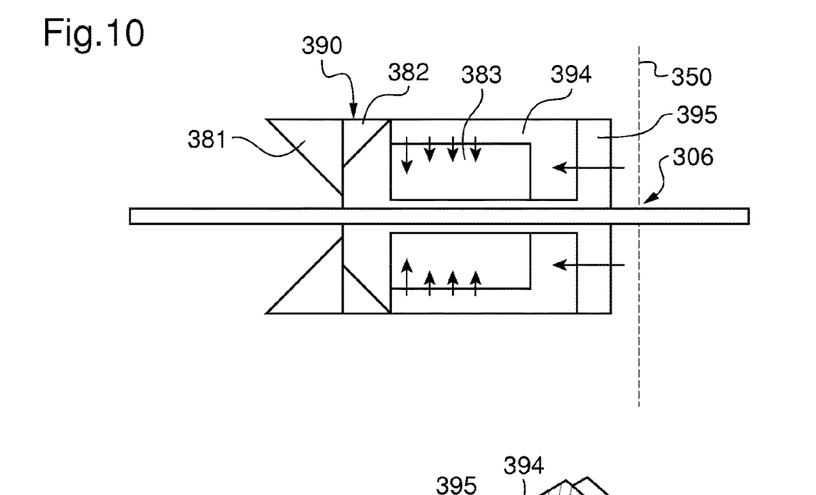

In each through passage 401, 402 an insertion cone 381 is formed and a gland 390 is accommodated such as the one illustrated in FIG. 10. This gland comprises a deformable split cylinder 394 (see through passage 401), an elastic sleeve 383 (removed from the gland of the through passage 401 to enable the split cylinder 394 to be seen), a clamping plate 395, and a bearing cone 382 formed in the slide. The elastic sleeve 383 is of a light-tight material, or that is at the very least tight to radiation having wavelengths equal to those of the LASER diodes equipping the device. The clamping plate 395 may be moved in the longitudinal direction of the through passages 401, 402. When the clamping plate 395 is brought towards the bearing cone 382 (following the arrow parallel to the cable illustrated in FIG. 10), the split cylinder 394 is pushed against the bearing cone 382 and the end of its tongues (delimited by the slots) come towards the cable receiving track, thereby radially compressing the elastic sleeve 383 (see radial arrows represented in FIG. 10). The elastic sleeve 383 then comes to sealingly clamp the cable to strip; the cable and the sleeve thus completely obturate the entry aperture 307 of the cable; no radiation can leave the device according to the invention (if the cable receiving track 306 passes entirely across, a pivoting cover is provided on the back face of the device to be able to obturate the cable exit aperture also) and the safety of the operator is maintained.

Figure 9:
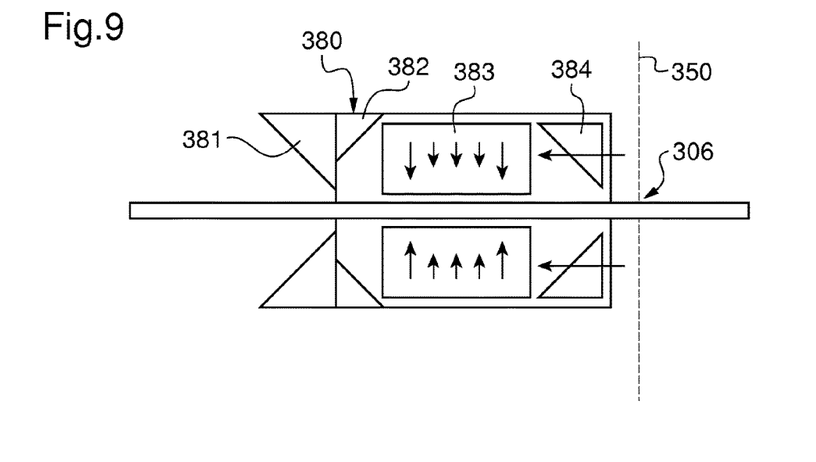
FIGS. 9 and 10 are diagrammatic views in longitudinal cross-section of two embodiments of a gland-based holding assembly of a device according to the invention.

FIG. 9 illustrates another example of a gland which may be associated with the slide 400. In the manner of the gland described previously, the gland 380 comprises a light-tight elastomer sleeve, a bearing cone 382. Instead of the split cylinder 394, it comprises a compression cone 384 which may be pushed longitudinally towards the bearing cone 382 by the clamping plate 395. Here too, the movement of the clamping plate 395 drives the radial compression of the elastic sleeve which comes to sealingly clamp the cable to strip that is accommodated in the cable receiving track 306, thereby providing both the holding of the cable in a stripping position and the obturation of the cable entry aperture.

The invention may be the object of numerous variants relative to the embodiments illustrated, provided those variants enter the scope delimited by the claims.

The invention claimed is:

1. An electric cable stripping device, comprising:
   at least one stripping beam emitted by a LASER source and focused by an optical assembly to a cutting point, and further including at least one receiving track for receiving a portion of cable to strip, each LASER source including a LASER diode emitting a stripping beam of wavelength between 400 nm and 460 nm; and
   for at least one stripping beam, a monitoring system including at least one photodiode for capture and analysis of an optical verification signal emitted by the cable to strip, and a control adapted to change one or more of an angle or a speed of pivoting of a motor-driven pivoting mirror according to results of the analysis of the optical verification signal.

2. A device according to claim 1, wherein each LASER source is a LASER diode emitting a stripping beam of wavelength between 400 nm and 410 nm or between 440 nm and 460 nm.

3. A device according to claim 1, comprising mechanical directing structure adapted to move at least one cutting point around a cable receiving track in a transverse plane.

4. A device according to claim 1, comprising mechanical directing structure adapted to move at least one cutting point along a rectilinear cable receiving track.

5. A device according to claim 1, wherein each cable receiving track is provided with a retractable stop that is movable between an extended position and a retracted position, wherein, in the retracted position, the stop allows the passage of the cable, the cable then passing across the device and which, and in extended position, crosses the cable receiving track and thus closes the passage to the cable in order to enable stripping of one end of the cable wedged against the stop.

6. A device according to claim 1, comprising several rectilinear receiving tracks for cables to strip, these tracks extending in the same plane parallel to each other in a longitudinal direction (X), and in that the device includes mechanical directing structure adapted to move at least one cutting point or at least one receiving track in a transverse direction (Y) arranged at a right angle relative to the longitudinal direction X and parallel to the plane of the cable receiving tracks.

7. A device according to claim 1, comprising at least two stripping beams, the cutting points of said beams being situated on respective opposite sides of a cable receiving track, in the same transverse stripping plane.

8. A device according to claim 1, comprising four stripping beams distributed around a cable receiving track each of the stripping beams being formed by a transverse primary beam emitted by a blue or violet laser diode in the stripping plane, and reflected by the motor-driven pivoting mirror, the motor-driven pivoting mirrors being controlled out of synchronization such that the stripping beams do not cross each other.

9. A device according to claim 1 comprising three or four stripping beams distributed around a cable receiving track, each of the stripping beams being formed by a primary beam emitted by a blue or violet laser diode in a direction parallel to the cable receiving track, and reflected by the motor-driven pivoting mirror.

10. A device according to claim 9, wherein the device has a front face having a cable entry aperture into which the cable to strip may be inserted, and in that each motor-driven pivoting mirror is associated with a motor arranged behind the corresponding laser diode.

11. A device according to claim 1, comprising, for each cable receiving track, a gland provided with a sleeve of light-tight elastic material for holding the cable to strip in the cable receiving track.

12. A device according to claim 11, comprising a slide able to slide in a direction at a right angle to the cable receiving track and including at least two through passages of different inside diameters, each through passage being provided with a gland with a sleeve of a light-tight elastic material.

13. A device according to claim 12, wherein the device is adapted to measure a diameter of the cable to strip accommodated in a cable receiving track and to adjust the sleeve radially, according to the diameter measured.

14. A device according to claim 1, comprising an autofocus system for the feedback control of a cutting point, adapted to determine the position of said cutting point relative to a surface of the cable to strip, wherein the cable to strip is accommodated in a corresponding one of the at least one receiving track, this autofocus system including two verification beams which are coplanar with the stripping beam and surround the latter, as well as an imaging objective and an image sensor configured for capture and analysis of a verification image formed by radiation reflected by the cable accommodated in the receiving track, said receiving track extending in a longitudinal direction qualified as inclined, which, in a plane containing the axial direction of the stripping beam and the longitudinal direction of the receiving track, forms a non-zero angle with a normal direction of stripping at a right angle to the axial direction of the stripping beam.

15. A device according to claim 1, comprising a battery configured to supply electricity to the LASER source.

16. An electric cable stripping device, including at least one stripping beam emitted by a LASER source and focused by an optical assembly to a cutting point, and further including at least one receiving track for receiving a portion of cable to strip, each LASER source including a GaN LASER diode emitting a visible stripping beam of wavelength between 400 nm and 460 nm.

* * * * *